US011393262B2

(12) United States Patent
Nishikawa

(10) Patent No.: US 11,393,262 B2
(45) Date of Patent: Jul. 19, 2022

(54) VEHICLE MANAGEMENT SYSTEM, VEHICLE MANAGEMENT PROGRAM, AND VEHICLE MANAGEMENT METHOD

(71) Applicant: HONDA MOTOR CO., LTD., Tokyo (JP)

(72) Inventor: Yuji Nishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 491 days.

(21) Appl. No.: 16/515,690

(22) Filed: Jul. 18, 2019

(65) Prior Publication Data

US 2020/0027283 A1   Jan. 23, 2020

(30) Foreign Application Priority Data

Jul. 20, 2018   (JP) .............................. JP2018-136390

(51) Int. Cl.
*G07C 5/00*      (2006.01)
*G06F 3/16*      (2006.01)
(Continued)

(52) U.S. Cl.
CPC ............. *G07C 5/008* (2013.01); *G06F 3/167* (2013.01); *G10L 15/22* (2013.01); *G10L 15/30* (2013.01);
(Continued)

(58) Field of Classification Search
CPC ... G10L 15/22; G10L 2015/223; G10L 15/30; G10L 2015/221; G10L 2015/225; G10L 2015/228; B60R 16/0373; G07C 5/008; G06F 3/167; B60H 1/00642; B60L 53/00; Y02T 10/70; Y02T 10/7072; Y02T 90/14
See application file for complete search history.

(56) References Cited

U.S. PATENT DOCUMENTS 9,947,333 B1   4/2018   David et al.
2008/0183484 A1   7/2008   Kondo et al.
(Continued)

FOREIGN PATENT DOCUMENTS

JP   H08-149608 A   6/1996
JP   2006-352759 A   12/2006
(Continued)

OTHER PUBLICATIONS

Japanese Office Action received in corresponding JP application No. 2018-136390 dated Jan. 7, 2020 with English translation (7 pages).

*Primary Examiner* — Matthew H Baker
(74) *Attorney, Agent, or Firm* — Rankin, Hill & Clark LLP

(57) ABSTRACT

In order to quickly respond to a question for vehicle information from a vehicle user at a remote location and offer the user a sense of relief, a vehicle management system of the present invention comprises a telematics communication unit which is mounted on a vehicle and acquires vehicle information and, a vehicle information server which receives from the telematics communication unit the vehicle information and a time at which the vehicle information is acquired, stores the received vehicle information and time, and transmits the stored vehicle information and time to a speech processing system as a response to a question when receiving the question about the vehicle information from the speech processing system.

9 Claims, 7 Drawing Sheets

(51) Int. Cl.
*G10L 15/22* (2006.01)
*G10L 15/30* (2013.01)

(52) U.S. Cl.
CPC .. *G10L 2015/221* (2013.01); *G10L 2015/223* (2013.01); *G10L 2015/225* (2013.01); *G10L 2015/228* (2013.01)

(56) References Cited

U.S. PATENT DOCUMENTS

| | | |
|---|---|---|
| 2008/0263100 A1 | 10/2008 | Van Engelshoven et al. |
| 2009/0248419 A1* | 10/2009 | Spaulding ............... G10L 15/22 704/275 |
| 2010/0268411 A1 | 10/2010 | Taguchi |
| 2014/0136200 A1* | 5/2014 | Winter .................... G10L 15/07 704/244 |
| 2014/0136202 A1* | 5/2014 | Sims, III ............... G10L 15/065 704/244 |
| 2014/0136214 A1* | 5/2014 | Winter .................... G10L 15/22 704/275 |
| 2015/0170653 A1* | 6/2015 | Berndt .................... G10L 15/22 704/275 |
| 2015/0310865 A1* | 10/2015 | Fay ........................ G10L 15/01 704/254 |
| 2016/0180853 A1 | 6/2016 | David et al. |
| 2019/0019516 A1* | 1/2019 | Van Hoecke ........... G10L 25/78 |

FOREIGN PATENT DOCUMENTS

| | | |
|---|---|---|
| JP | 2008-179314 A | 8/2008 |
| JP | 2010-252449 A | 11/2010 |
| JP | 2011-082937 A | 4/2011 |
| JP | 2014-064461 A | 4/2014 |
| JP | 2018-506105 A | 3/2018 |

\* cited by examiner

FIG. 3

| Time | TCU remote control user ID | Inside temperature | Outside temperature | Charging rate | Fuel level | Travelable distance (A/C on) | Travelable distance (A/C off) | A/C state | Charge state |
|---|---|---|---|---|---|---|---|---|---|
| 20180615 6:00:00 | V001 | # | # | # | # | # | # | OFF | Charging |
| 20180615 7:00:00 | V001 | # | # | # | # | # | # | OFF | Charging |
| 20180615 8:00:00 | V001 | # | # | # | # | # | # | OFF | Charging |
| 20180615 9:00:00 | V001 | # | # | # | # | # | # | OFF | Charging |
| 20180615 10:00:00 | V001 | # | # | # | # | # | # | OFF | Charging |
| 20180615 10:52:03 | V001 | # | # | 40% | # | # | # | OFF | Charging |
| 20180615 11:00:00 | V001 | # | # | # | # | # | # | OFF | Charging |
| 20180615 12:00:00 | V001 | # | # | 50% | # | # | # | OFF | Charging |
| 20180615 12:43:08 ... | | | | | | | | | |

VEHICLE MANAGEMENT SYSTEM, VEHICLE MANAGEMENT PROGRAM, AND VEHICLE MANAGEMENT METHOD

CROSS REFERENCE TO RELATED APPLICATIONS

This application claims the foreign priority benefit under 35 U.S.C. § 119 of Japanese patent application No. 2018-136390 filed on Jul. 20, 2018, the disclosure of which is incorporated herein by reference.

FIELD OF THE INVENTION

The present invention relates to a vehicle management system, a vehicle management program, and a vehicle management method.

DESCRIPTION OF THE RELATED ART

Recent advancement of communication technologies has enabled various types of vehicle information to be acquired from remote locations. A mobile terminal of Patent Literature 1 (JP2011-082937A) notifies a mobile terminal user of a charging rate of an electric vehicle which is being charged. An electric vehicle telephone control system of Patent Literature 2 (JPH08-149608A) uses a telephone outside of an electric vehicle to control a charging rate of the electric vehicle and operation of an electric air conditioner thereof. An audio-based system of Patent Literature 3 (JP2018-506105A), which is not limited to a vehicle, accepts a user's voice and determines which application the accepted voice is to be inputted to among plural applications. A system of patent Literature 4 (U.S. Pat. No. 9,947,333B1) separately includes: a server that recognizes the waveform of a speech produced from a user in the form of texts; and a server that responds to the texts.

PATENT LITERATURES

Patent Literature 1: JP2011-082937A
Patent Literature 2: JPH08-149608A
Patent Literature 3: JP2018-506105A
Patent Literature 4: U.S. Pat. No. 9,947,333B1

SUMMARY OF THE INVENTION

In some cases, a user wants to ask a question by a voice about vehicle information from a remote location and acquire the vehicle information by voice. For example, an electric vehicle is being charged at a plug-in station while the driver is working in a kitchen of the driver's house away from the electric vehicle. The user wants to go back to the plug-in station when a battery charge rate reaches a user's desired percentage or higher. The user asks by a voice a voice terminal device or the like in the house about a charging rate. The voice terminal device receives a response thereto before long and the response result is read out by a voice. However, a period of time "before long" is sometimes longer than expected by a user.

Generally, in order to save a communication volume and power consumption, a telematics communication unit is in sleep mode for a while when a vehicle is parked. The sleep mode is a state in which the telematics communication unit is supplied with a minimum power while maintaining minimum functions. A mode other than the sleep mode, that is, a mode in which the telematics communication unit is exerting normal functions is referred to as an operation mode. In order for an in-vehicle computer in the sleep mode to acquire a current charging rate, the in-vehicle computer may be shifted (restarted) to the operation mode. However, this requires a long time. The user needs to wait for a response for a long time after asking a question by a voice. The user sometimes misses the voice response that arrives when least expected. If a terminal device has a screen, the terminal device displays a user interface or the like representing "search in progress" or displays acquired information on the screen. This relieves the discomfort of a user. However, in a case where a user asks a terminal device not having any screen or in a situation where a user cannot look at a screen (when the user is working in a kitchen, for example), the aforementioned problem becomes more enormous. In addition, even if the user can catch a received voice response, the user does not know when the information in the response was acquired and becomes nervous in some cases. For example, in a case where the content of a response to a first question asked by a user ("What is a charging rate of the vehicle?") is the same as the content of a response to a question asked by the user for reconfirmation after a predetermined time, the user is worried if the vehicle is being charged properly.

Patent Literatures 1 to 4 do not particularly describe about such problems. The present invention has been designed to solve the above problem and has an objective to quickly respond to a question about vehicle information asked by a vehicle user at a remote location and offer the user a sense of relief.

A vehicle management system according to the present invention includes: a telematics communication unit which is mounted on a vehicle and acquires vehicle information; and a vehicle information server which receives the vehicle information and a time at which the vehicle information is acquired from the telematics communication unit and stores the received vehicle information and time, and transmits the stored vehicle information and the time to a speech processing system as a response to a question when receiving the question about the vehicle information from the speech processing system.

According to the present invention, it is possible to quickly respond to a question about vehicle information from a vehicle user at a remote location and offer the user a sense of relief.

BRIEF DESCRIPTION OF THE DRAWINGS

FIG. 2 is a diagram for explaining the configuration of a vehicle information server and the like.

FIG. 3 is a diagram illustrating an example of vehicle information.

DETAILED DESCRIPTION OF THE EMBODIMENTS

Modes for implementing the present invention (hereinafter, referred to as embodiments) will be hereinafter described in detail with reference to the accompanying drawings. The embodiment is an example in which a user (a driver in many cases) of an electric vehicle asks a question about vehicle information through a voice terminal device. The vehicle management system of the present invention is generally applicable to machines with a quantity of state changing over time.

(Environment)

Figure 1:
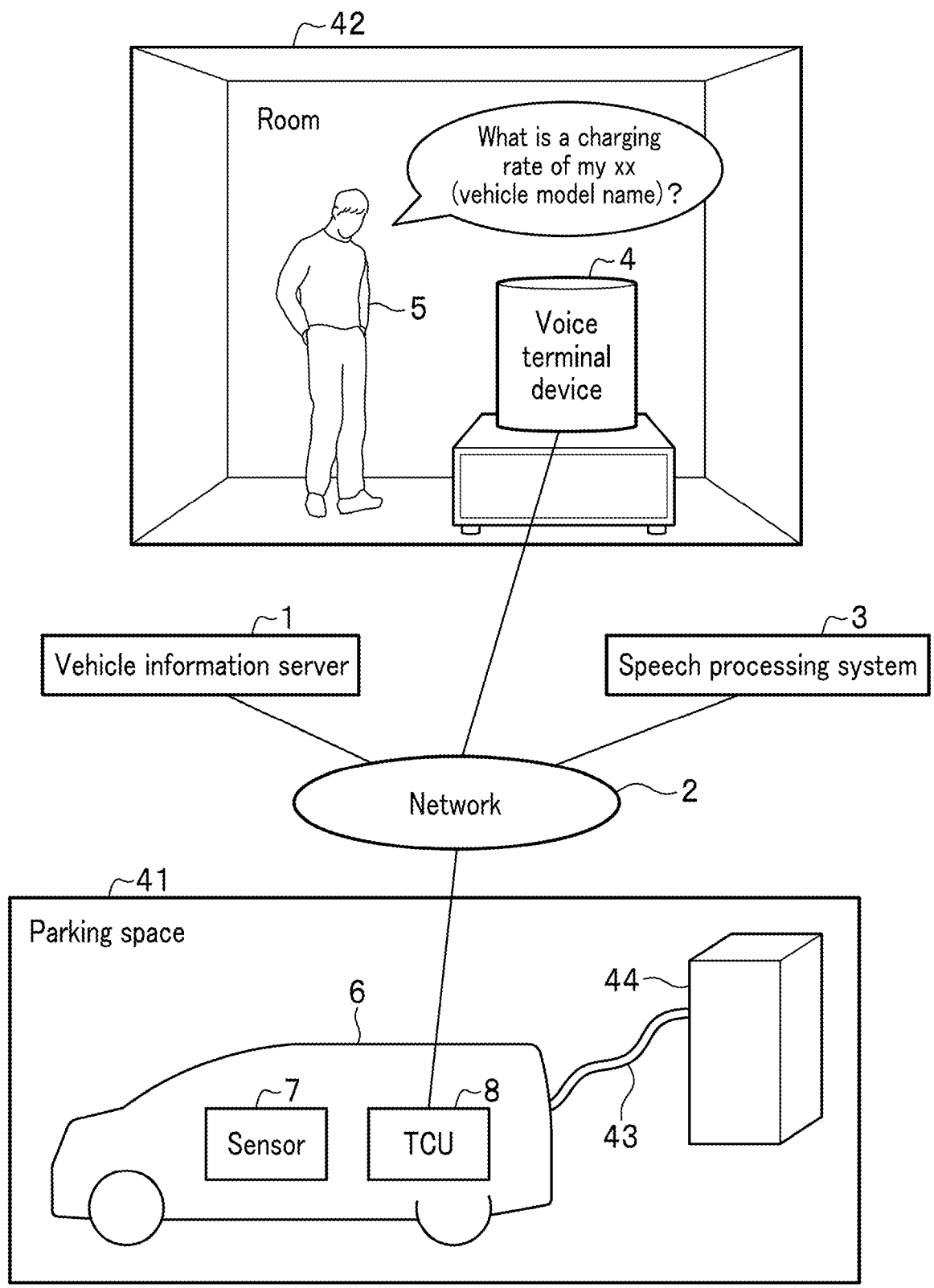
FIG. 1 is a diagram for explaining an environment where a vehicle management system is used.

The environment in which a vehicle management system of the present embodiment is used will be described with reference to FIG. 1. A vehicle 6 is parked in a parking space 41. The vehicle 6 is an electric vehicle including a driving battery (a plug-in hybrid electric vehicle, an electric vehicle, or a fuel cell vehicle). The vehicle management system of the present embodiment is intended for electric vehicles but may be intended for gasoline and diesel vehicles not including driving batteries. The vehicle 6 is connected to a charge device 44 through a power cable 43 and is being supplied with power. The vehicle 6 includes a sensor 7 and a telematics communication unit (TCU) 8. The sensor 7 measures an amount of charge of the battery.

The telematics communication unit 8 is a computer to control exchanges of various vehicle information with the outside. The telematics communication unit 8 is just referred to as a TCU 8 hereinafter. The TCU 8 acquires an amount of charge or a charging rate with respect to the full charge from the sensor 7 at each predetermined time and transmits the acquired amount of charge and the like to a vehicle information server 1 through a network 2. If the intervals between the predetermined times are set excessively short, costs of a communication volume, power consumption, and the like increase. In addition, it takes some time to acquire a charging rate and the like from the sensor 7 in response to a request as described in "BACKGROUND ART" above.

A user 5 of the vehicle is in a room 42 distant from the parking space 41 and is waiting for the vehicle to finish charging. The user 5 speaks to a voice terminal device 4 (a microphone) to ask: "What is a charging rate of my xx (vehicle model name)?" while doing housework. The voice terminal device 4 captures a speech signal (a time-series waveform) from the user 5 and transmits the speech signal to a speech processing system 3 through the network 2. The speech processing system 3 recognizes the speech signal as meaningful text information.

The speech processing system 3 transmits the text information to the vehicle information server 1 through the network 2. The vehicle information server 1 then retrieves vehicle information (numerical information of a charging rate or the like) as a response to the text information and transmits the retrieved vehicle information to the speech processing system 3 thorough the network 2. The speech processing system 3 then synthesizes a natural language speech signal (a time-series waveform) that represents the vehicle information and transmits the same to the voice terminal device 4 through the network 2. The voice terminal device 4 (a speaker) answers: "The charging rate was XX % at hh:mm:ss (time)".

The voice terminal device 4 may be a smart speaker, a common smartphone, or a dedicated terminal designed to suit the atmosphere of a room. The voice terminal device 4 in FIG. 1 has a columnar appearance. The voice terminal device 4 is able to receive and output sounds in either case. An operator of the vehicle information server 1 is often a vehicle manufacturer. On the other hand, an operator of the speech processing system 3 is the same vehicle manufacturer in some cases but is a different company in many cases. The different company is often a manufacturer or a vender of the voice terminal device 4.

When an operator of the speech processing system 3 is different from an operator of the vehicle information server 1, there are prearrangements and the like therebetween, such as "the speech processing system 3 communicates with the vehicle information server 1 operated by a manufacturer of "xx (vehicle model name)" when the speech processing system 3 receives a speech signal concerning "xx (vehicle model name)", for example.

When an operator of the speech processing system 3 is the same as an operator of the vehicle information server 1, the speech processing system 3 and vehicle information server 1 may be integrated. The voice terminal device 4 may include the function of the speech processing system 3. The vehicle information server 1 may be composed of plural units for different countries or regions. The same applies to the speech processing system 3. In the aforementioned example, the sensor 7 acquires a charging rate as vehicle information. However, in addition to the charging rate, vehicle information can include temperatures inside and outside of the vehicle, a fuel level, and the like. The vehicle 6 therefore includes a plurality of sensors 7 to acquire plural types of vehicle information.

(Configuration of Vehicle Information Server and the Like)

Figure 2:
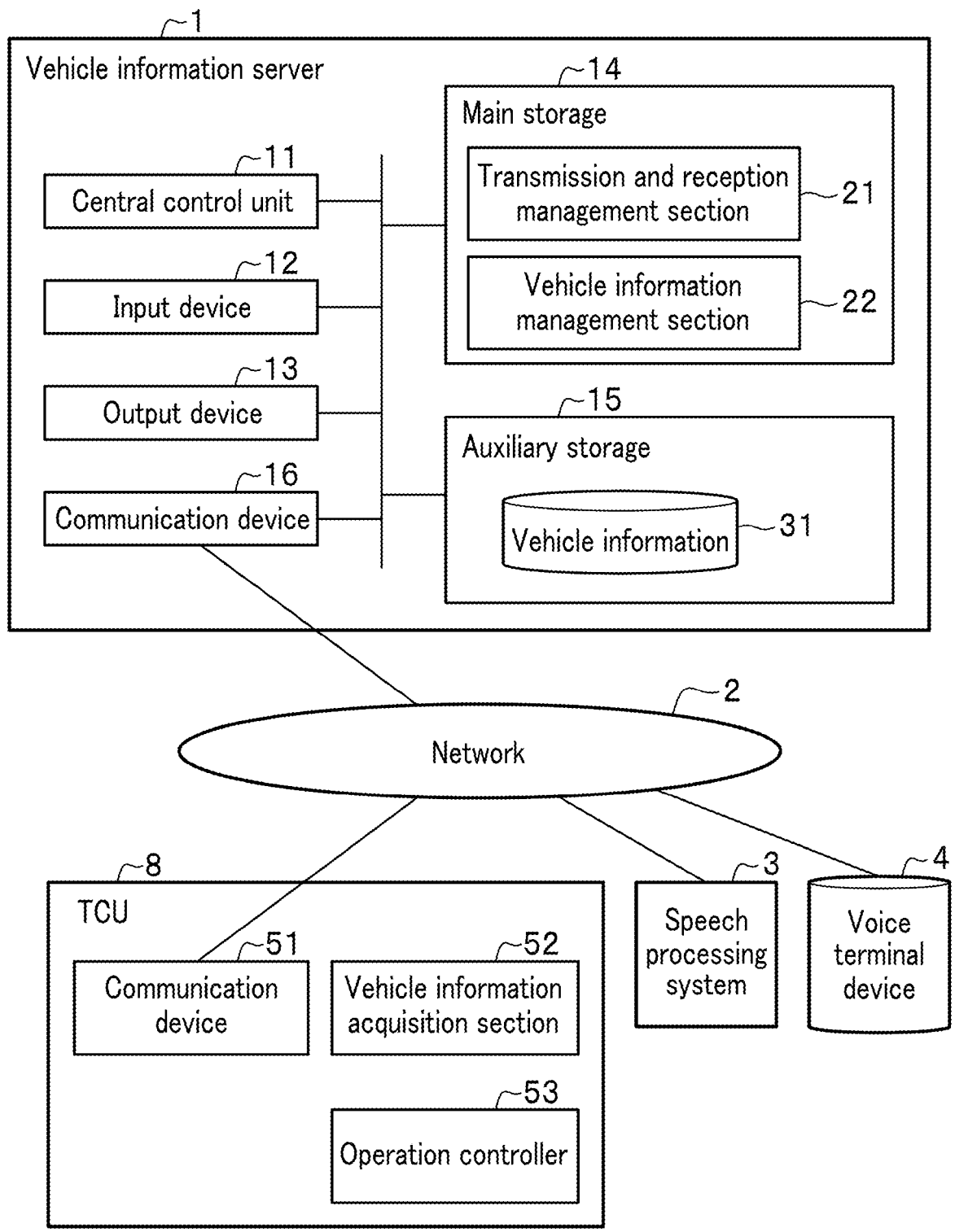

With reference to FIG. 2, the configuration of the vehicle information server 1 and the like will be described. The vehicle information server 1 is a typical computer and includes a central control unit 11, an input device 12, such as a mouse or a keyboard, an output device 13, such as a display, a main storage 14, an auxiliary storage 15, and a communication device 16. These devices are connected to each other through a bus. The auxiliary storage 15 stores vehicle information 31 (described in detail later). A transmission and reception management section 21 and a vehicle information management section 22 in the main storage 14 are programs. The central control unit 11 retrieves these programs from the auxiliary storage 15 and loads the programs to the main storage 14 to implement the functions (described in detail later) of the programs.

The TCU 8 includes a communication device 51, a vehicle information acquisition section 52, and an operation controller 53. The vehicle information acquisition section 52 and operation controller 53 are programs. The TCU 8 may include a central control unit, an input device, an output device, a main storage, and an auxiliary storage, not illustrated. The vehicle information server 1 and TCU 8 constitute a vehicle management system.

(Vehicle Information)

With reference to FIG. 3, the vehicle information 31 will be described. In association with a time stored in a time field 101, the vehicle information 31 stores: a user ID for remote control of the TCU 8 in a TCU remote control user ID field 102; an inside temperature in an inside temperature field 103; an outside temperature in an outside temperature field 104; a charging rate in a charging rate field 105; a fuel level in a fuel level field 106; a travelable distance with an air conditioner running in a travelable distance (A/C on) field 107; a travelable distance with the air conditioner stopped in a travelable distance (A/C off) field 108; an A/C operation flag in a A/C state field 109; and a charge flag in a charge state field 110.

The times in the time field 101 indicates the date and time (year-month-day, hours:minutes:seconds) when the various types of sensors 7 acquired values of various types of vehicle information.

The user ID for remote operation of the TCU 8 in the TCU-8 remote control user ID field 102 is an identifier that uniquely identifies a vehicle.

The inside temperature in the inside temperature field 103 is a temperature inside of the vehicle.

The outside temperature in the outside temperature field 104 is a temperature outside of the vehicle (a temperature near the roof, for example).

The charging rates in the charging rate field 105 is a percentage obtained by dividing the battery level at that time by a maximum capacity of the battery. The charging rate field 105 may store amount of power storage instead of or in addition to the charging rate.

The fuel level in the fuel level field 106 is the amount of fuel (gasoline, light oil, or the like) remaining in the vehicle in a case where the vehicle uses an internal combustion power secondarily.

The travelable distance in the travelable distance (A/C on) field 107 is a travelable distance in a case of driving the vehicle with the air conditioner running.

The travelable distance (A/C off) field 108 is a travelable distance in a case of driving the vehicle with the air conditioner stopped.

The A/C operation flag in the A/C state field 109 is any one of "ON" and "OFF". "ON" indicates that the air-conditioner is running while "OFF" indicates that the air-conditioner is stopped.

The charge flag in the charge state field 110 is any one of "charging" and "discharging". "Charging" indicates the state in which the charge plug is inserted to the battery and the battery is charging while "discharging" indicates the other state.

Symbols "#" in FIG. 3 are abbreviated expressions for different values or identical values (the fuel level during parking at night time or the like).

The vehicle information server 1 stores records one by one at each predetermined time (every hour or each time that a charging rate experience a 10% increase, for example) as illustrated in FIG. 3. Alternatively, the vehicle information server 1 may delete (overwrite and update) the previous records, with the latest record left.

FIG. 3 illustrates the following matters, for example.

The TCU 8 transmits values of various types of vehicle information acquired by the sensors 7 every hour, to the vehicle information server 1. Not revealed directly by FIG. 3, after transmitting the vehicle information, the TCU 8 goes into the sleep mode until the next transmission. The present invention enables quick response to the user while minimizing the frequency at which the system (the TCU 8) on the vehicle side is restarted.

For example, it is assumed that the user requested at 10:30:00 a value of vehicle information. The vehicle information server 1 then transmits the latest one (in a row 111) of past values of vehicle information already stored, to the voice terminal device 4 through the speech processing system 3 while leaving the TCU 8 in the sleep mode. As a result, the user is able to instantly know the value of vehicle information although the value is data measured at 10:00:00, which is 30 minutes ago.

Herein, it is assumed that the user does not satisfy the value of the vehicle information acquired by the sensor 7 at 10:00:00 herein and wants to know data measured at the time 10:30:00 when the user requested the value of vehicle information. In this case, if the user requests new data, the vehicle information server 1 shifts the TCU 8 from the sleep mode to the operation mode and acquires a new value of vehicle information measured by the sensor 7, from the TCU 8.

(Overall Processing Procedure)

Hereinafter, overall processing procedures will be described. The overall processing procedures include a first overall processing procedure and a second overall processing procedure. In the first overall processing procedure, the vehicle information server 1 acquires the latest one of the past values of vehicle information stored in the vehicle information server 1 as a response to a question from the user 5. In the second overall processing procedure, the vehicle information server 1 acquires the current value of vehicle information from the TCU 8. In the first overall processing procedure, the user does not wait long. In the second overall processing procedure, the user waits a little long but is able to know data measured at a time close to the current time.

(First Overall Processing Procedure)

Figure 4:
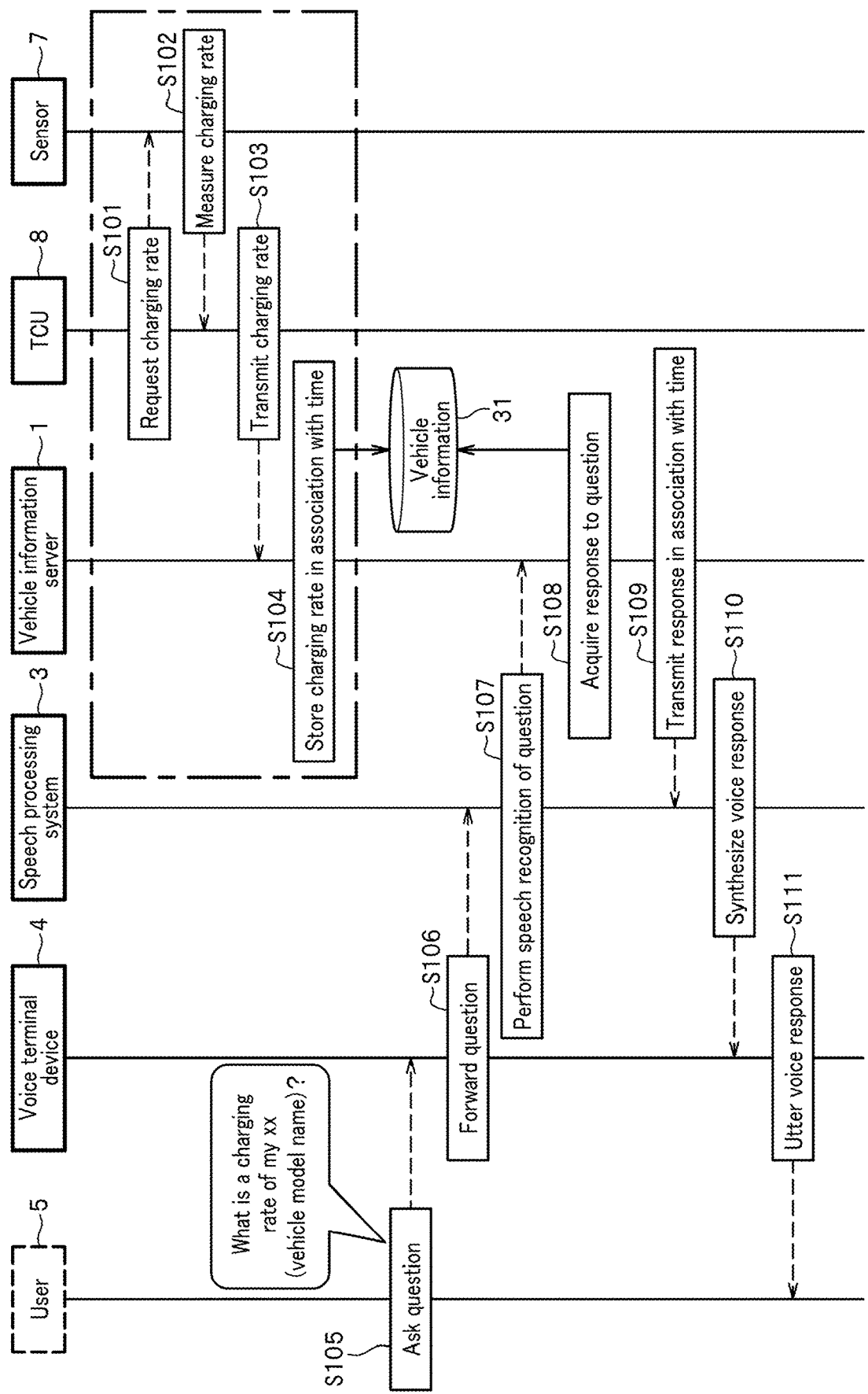
FIG. 4 is a sequence chart for explaining a first overall processing procedure (No. 1).
Figure 5:
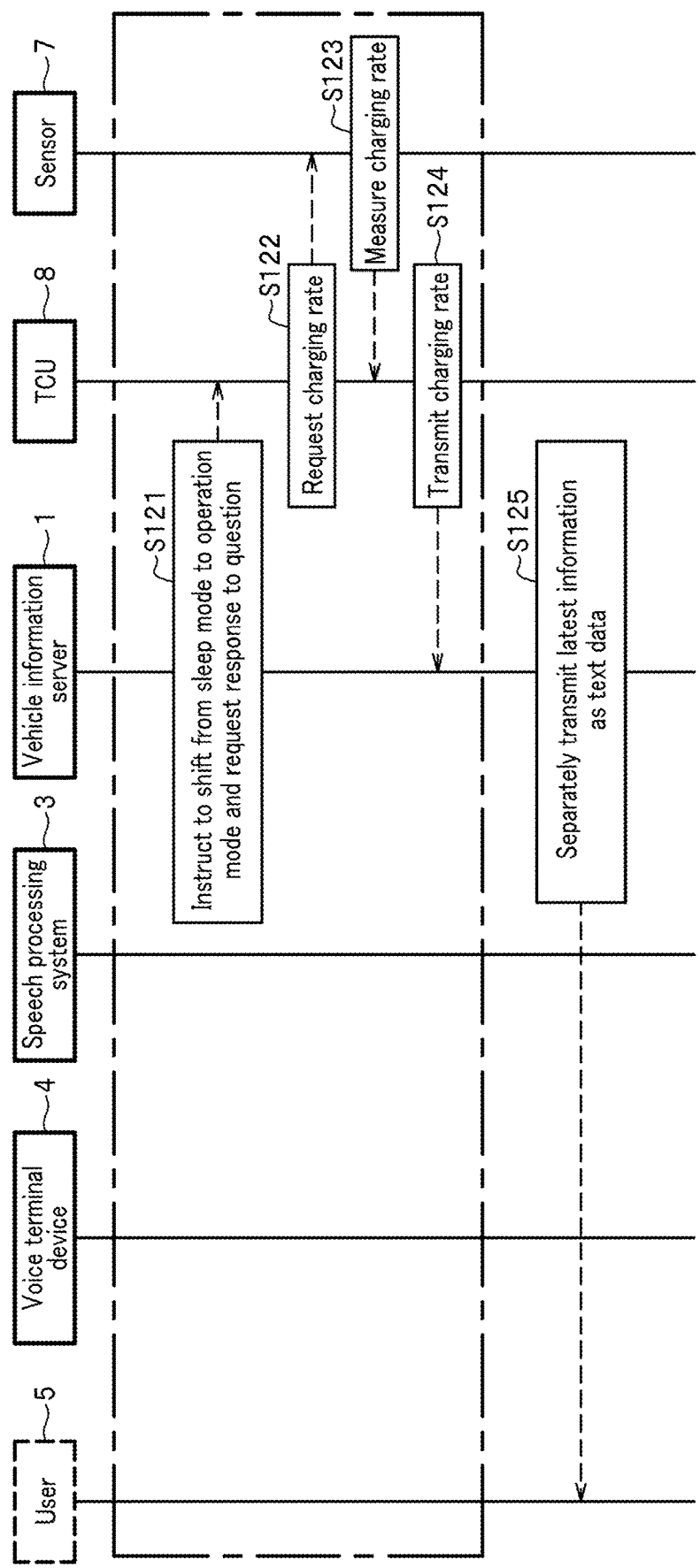
FIG. 5 is a sequence chart for explaining the first overall processing procedure (No. 2).

With reference to FIGS. 4 and 5, the first overall processing procedure will be described. The first overall processing procedure is illustrated in FIGS. 4 and 5 as two sequential blocks due to space limitation, and FIG. 5 follows FIG. 4. For simplifying explanation, it is assumed that vehicle information includes only the charging rate in explanations of FIGS. 4 to 6.

In a step S101, the TCU 8 requests the charging rate. Specifically, first the operation controller 53 recognizes that the predetermined time has come. The predetermined time is every hour, for example. The predetermined time may be every hour from the start of charging. Alternatively, the predetermined time may be time at which a charging rate experiences a 10 percent increase from the previous measurement. In such a case, an in-vehicle battery ECU always monitors a charging rate through the sensor 7 without going into sleep mode.

Each time a charging rate experiences a 10 percent increase, the battery ECU restarts the TCU 8, and the TCU 8 transmits data to the vehicle information server 1, for example. As described above, it takes some time to restart the TCU 8 due to system checks and the like. In this example, the battery ECU may be embedded in the sensor 7.

Secondly, the operation controller 53 shifts the TCU 8 from the sleep mode to the operation mode. This requires some time due to system checks and the like.

Thirdly, the vehicle information acquisition section 52 requests the sensor 7 to transmit a current charging rate to the TCU 8.

In a step S102, the sensor 7 measures a charging rate. Specifically, the sensor 7 measures the charging rate and transmits the measured charging rate to the TCU 8 together with the measurement time. The TCU 8 receives the charging rate and time.

In a step S103, the TCU 8 transmits the charging rate. Specifically, first, the vehicle information acquisition section 52 transmits to the vehicle information server 1 the received charging rate and time and the user ID for remote operation of the TCU 8.

Secondly, the operation controller 53 shifts the TCU 8 from the operation mode to the sleep mode. This enables power saving and the like.

In a step S104, the vehicle information server 1 stores the charging rate in association over time. Specifically, first the transmission and reception management section 21 receives from the TCU 8 the charging rate, the time, and the user ID for remote operation of the TCU 8.

Secondly, the vehicle information management section 22 creates a new record of the vehicle information 31 (FIG. 3) and stores the received charging rate, time, and user ID for remote operation of the TCU 8 in the charging rate field 105, time field 101, and TCU-8 remote operation user ID field 102 of the new record, respectively.

The process of the aforementioned steps S101 to S104 (within a long and short dashed line rectangle) is repeated at each predetermined time.

In a step S105, the user 5 asks a question. The question herein is a speech of: "What is a charging rate of my xxx (vehicle model name)?", for example. The voice terminal device 4 then receives the speech.

In a step S106, the voice terminal device 4 forwards the question. Specifically, the voice terminal device 4 transmits a speech signal (a time-series waveform) to the speech processing system 3. The speech processing system 3 receives the speech signal.

In a step S107, the speech processing system 3 performs speech recognition of the question. Specifically, the speech processing system 3 converts the received speech signal to a text and transmits a text of "charging rate" to the vehicle information server 1. The vehicle information server 1 receives the text "charging rate". The text may be transmitted to a server different from a server storing vehicle information. In this case, the server storing vehicle information and the different server constitute the vehicle information server 1. By linking the vehicle information server 1 to the user ID for remote operation of the TCU 8 in advance, the speech processing system 3 is able to work in corporation with the vehicle information server 1.

In a step S108, the vehicle information server 1 acquires a response to the question. Specifically, first, the vehicle information management section 22 confirms whether the text received from the speech processing system 3 matches a keyword previously defined ("charging rate", "battery level", or "amount of charge", for example).

Secondly, the vehicle information management section 22 acquires from the vehicle information 31 (FIG. 3), a record that relates to the keyword received in the step S107 and includes the latest past time.

Thirdly, the vehicle information management section 22 acquires as the response to the question, a value of vehicle information and the time in the time field 101 in the record acquired in the second process of the step S108. The value of the vehicle information is the value in the charging rate field 105 ("AA %" etc.) herein.

As a modification of the first overall processing procedure, steps S121 to S124 (within a long and short-dashed line rectangle) in FIG. 5 may be executed in parallel to the process of steps S108 to S111 in FIG. 4 just after the step S108 (described in detail later).

In the step S109, the vehicle information server 1 transmits the response in association over time. Specifically, the transmission and reception management section 21 transmits to the speech processing system 3, the value of the vehicle information and the time acquired in the second process of the step S108. The speech processing system 3 receives the value of the vehicle information and the time.

In the step S110, the speech processing system 3 synthesizes a voice response. Specifically, first, the speech processing system 3 synthesizes a speech signal (a time-series waveform) representing the value of the vehicle information and the time (both are numerical) received in the step S109. Herein, the waveform of the synthesized speech signal represents a statement: "The charging rate was XX % at hh:mm:ss".

Secondly, the speech processing system 3 transmits the speech signal synthesized in the first process of the step S110, to the voice terminal device 4. The voice terminal device 4 receives the speech signal.

In the step S111, the voice terminal device 4 utters the voice response. Specifically, the voice terminal device 4 utters a statement: "The charging rate was XX % at hh:mm:ss".

The first overall processing procedure is then terminated.
(Example Modification of First Overall Processing Procedure)

With reference to FIG. 5, a first overall processing procedure (Subsequently) will be described.

In the step S121, the vehicle information server 1 instructs the ICU 8 to shift from the sleep mode to the operation mode and request a response to the question. Specifically, the vehicle information management section 22 transmits to the TCU 8, instructions to shift from the sleep mode to the operation mode and instructions to acquire a current charging rate from the sensor 7. The TCU 8 receives these instructions. It takes some time for the TCU 8 to shift from the sleep mode to the operation mode.

In the step S122, the TCU 8 requests the charging rate. Specifically, first the operation controller 53 shifts the TCU 8 from the sleep mode to the operation mode.

Secondly, the vehicle information acquisition section 52 requests the sensor 7 to transmit a current charging rate to the TCU 8.

The step S123 is the same as the step S102 in FIG. 4.

The step S124 is the same as the step S103 in FIG. 4.

The steps S121 to S124 are processing provided for the vehicle information server 1 in preparation for user's requests for the latest value of vehicle information.

A step S125 will be described later in the explanation of FIG. 7.

(Second Overall Processing Procedure)

Figure 6:
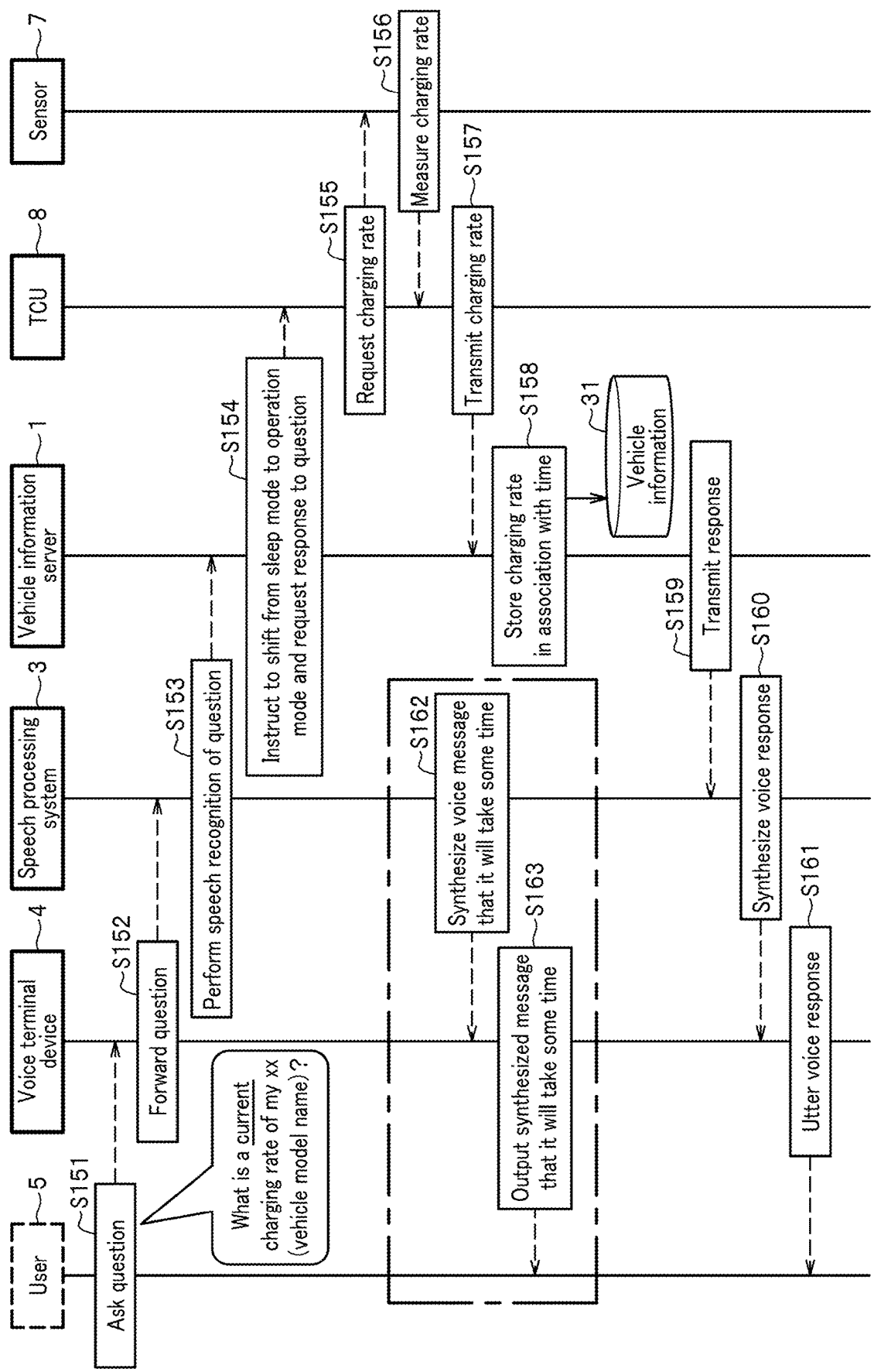
FIG. 6 is a sequence chart for explaining a second overall processing procedure.

With reference to FIG. 6, a second overall processing procedure will be described.

In a step S151, the user 5 asks a question. The question herein is a speech of: "What is a current charging rate of my xx (vehicle model name)?", for example. Compared with the step S105 in FIG. 4, the user 5 wants to know the "current" charging rate herein.

A step S152 is the same as the step S106 in FIG. 4.
A step S153 is the same as the step S107 in FIG. 4.
A step S154 is the same as the step S121 in FIG. 5.
A step S155 is the same as the step S122 in FIG. 5.
A step S156 is the same as the step S102 in FIG. 4.
A step S157 is the same as the step S103 in FIG. 4.
A step S158 is the same as the step S104 in FIG. 4.

In the step S159, the vehicle information server 1 transmits a response. Specifically, the transmission and reception management section 21 transmits to the speech processing system 3, a value of vehicle information received at a first process of the step S158 (S104). The speech processing system 3 receives the value of the vehicle information.

In a step S160, the speech processing system 3 synthesizes a voice response. Specifically, first, the speech processing system 3 synthesizes a speech signal (a time-series waveform) representing the value of the vehicle information received in the step S159.

Secondly, the speech processing system 3 transmits the speech signal synthesized in the first process of step S160, to the voice terminal device 4. The voice terminal device 4 receives the speech signal.

A step S161 is the same as the step S111 in FIG. 4.

The second overall processing procedure is then terminated. Although the second overall processing procedure has a simple configuration that does not announce time so that the user can easily listen to the response, the second overall processing procedure may have a configuration that announce time. In terms of time, steps S162 and S163 (within a long and short-dashed line rectangle) are executed just after the step S151. The details thereof will be described later in explanation of FIG. 7.

(Vehicle Information Server Processing Procedure)

Figure 7:
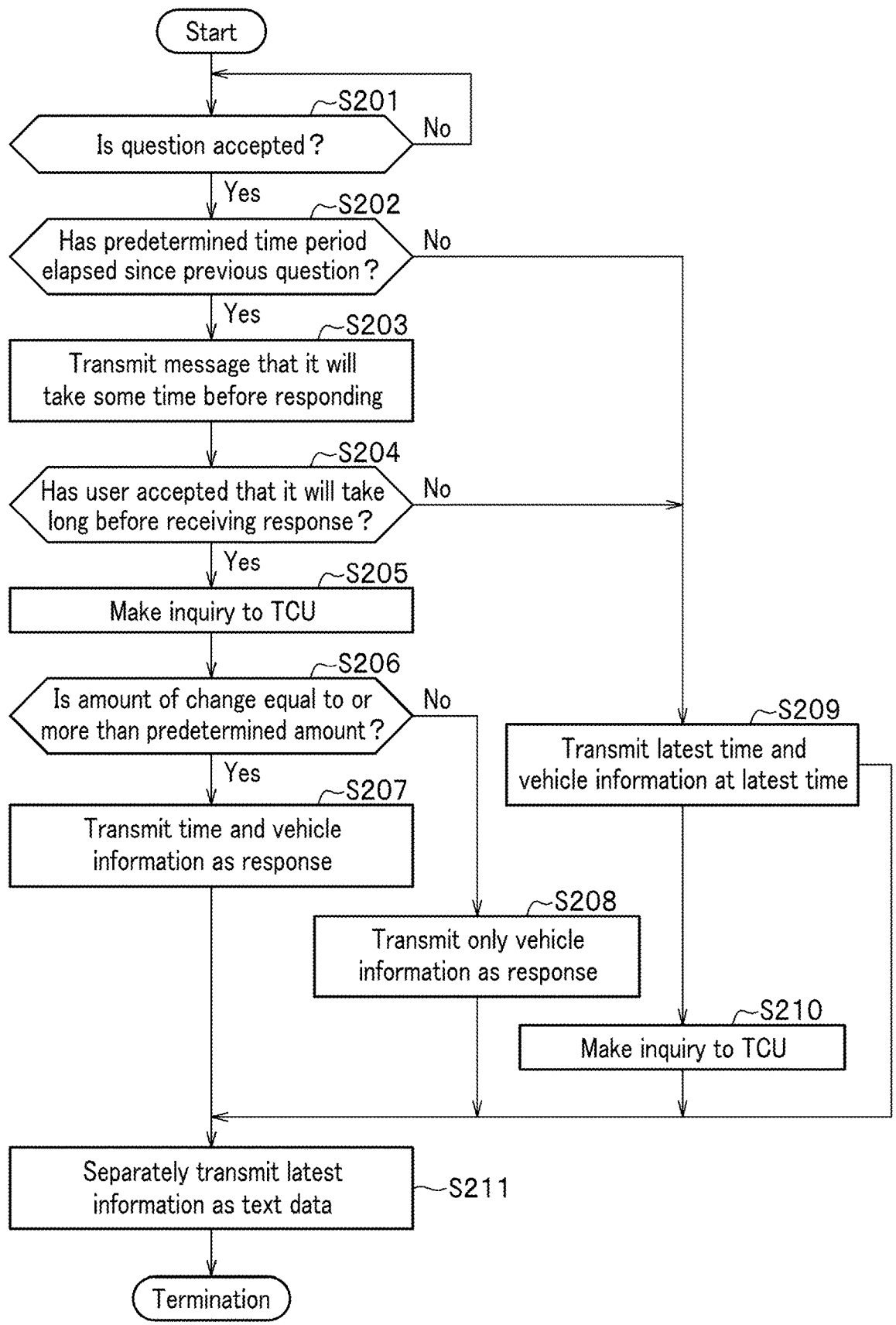
FIG. 7 is a flowchart for explaining a processing procedure carried out by the vehicle information server.

With reference to FIG. 7, the processing procedure carried out by the vehicle information server 1 will be described. FIG. 7 illustrates the processing carried out by the vehicle information server 1 and extracted from FIGS. 4 to 6.

In a step S201, the transmission and reception management section 21 determines whether a question is accepted. The question herein corresponds to the question in the step S151 of FIG. 5. Specifically, the user wants to know the current value of the vehicle information. The question herein is a question about a value of vehicle information other than a charging rate in some cases. When receiving the question from the user through the speech processing system 3 (Yes in the step S201), the transmission and reception management section 21 goes to a step S202. Otherwise (No in the step S201), the transmission and reception management section 21 waits for the question to be received.

In the step S202, the transmission and reception management section 21 determines whether a predetermined period of time has elapsed since the previous question. Specifically, when the period between the time when the previous question was received and the time when the current question was received is greater than a predetermined length (Yes in step S202), the transmission and reception management section 21 goes to a step S203. Otherwise (No in step S202), the transmission and reception management section 21 goes to a step S209.

In the step S203, the transmission and reception management section 21 transmits a message that it will take some time before responding. Specifically, first the transmission and reception management section 21 transmits a message that "It will take some time to search. Do you want a current data?", for example, to the voice terminal device 4 through the speech processing system 3. The processing of the speech processing system 3 is to synthesize a speech signal (a time-series waveform) from text data, which corresponds to the step S162 of FIG. 6. Subsequently to the processing in the step S162 of FIG. 6, the voice terminal device 4 outputs the synthesized speech in the step S163 of FIG. 6.

Secondly, the transmission and reception management section 21 receives Yes or No that the user inputs (speaks) to the voice terminal device 4 as a response to the message, through the speech processing system 3.

In a step S204, the transmission and reception management section 21 determines whether the user has accepted that it will take long to receive a response. Specifically, when receiving "Yes" as a response in the second process of the step S203 (Yes in the step S204), the transmission and reception management section 21 goes to step a S205. When receiving "No" (No in the step S204), the transmission and reception management section 21 goes to the step S209.

In the step S205, the vehicle information management section 22 makes an inquiry to the TCU 8. In the step S205, the vehicle information server 1, TCU 8, and sensor 7 execute the same processing as that in the steps S154 to S158 in FIG. 6. The vehicle information management section 22 then acquires the current value of vehicle information and the current time. The "current time" herein is delayed from the time (the step S154 of FIG. 6) when the vehicle information management section 22 makes an inquiry to the TCU 8, by the time required by the TCU 8 to shift from the sleep mode to the operation mode but is the latest one.

In a step S206, the vehicle information management section 22 determines whether an amount of change in vehicle information is equal to or more than a predetermined amount. Specifically, in a case that an amount of change over time in a piece of vehicle information concerning a question is equal to or more than a predetermined amount (Yes in the step S206), the vehicle information management section 22 goes to a step S207. Otherwise (No in the step S206), the vehicle information management section 22 goes to a step S208. A piece of information including an amount of change over time equal to or more than a predetermined amount includes an amount of charge of the vehicle and a temperature inside the vehicle, for example.

In the step S207, the transmission and reception management section 21 transmits the time and amount of charge as a response. Specifically, the transmission and reception management section 21 transmits the value of the vehicle information and the time acquired in the step S205, to the voice terminal device 4 through the speech processing system 3. The voice terminal device 4 then utters a statement of: "The charging rate was XX % at hh:mm:ss", for example.

In the step S208, the transmission and reception management section 21 transmits only the vehicle information as a response. Specifically, the transmission and reception management section 21 transmits the value of the vehicle information acquired in the step S205, to the voice terminal device 4 through the speech processing system 3. The voice terminal device 4 then utters statements: "The charging rate is xx %" or "The temperature inside the vehicle is yy degrees", for example.

In a step S209, the vehicle information management section 22 transmits a latest time and vehicle information at a latest time. Specifically, first, the vehicle information management section 22 acquires a record that includes a latest past time and relates to the vehicle of interest, from the vehicle information 31 (FIG. 3).

Secondly, the vehicle information management section 22 acquires a value of vehicle information and a time relating to a question, from the record acquired in the first process of the step S209 and transmits the acquired value of the vehicle information and the time, to the voice terminal device 4 through the speech processing system 3.

The voice terminal device 4 then utters statements: "The charging rate was xx % at hh:mm:ss", "The temperature inside the vehicle is yy degrees at hh:mm:ss", or the like, for example.

After the step S209, the process is split into two flows. One of the two flows goes to a step S211 via a step S210. The other one goes to step S211 without executing the step S210.

The step S210 is the same as the step S205.

In the step S211, the transmission and reception management section 21 separately transmits the latest information as text data. The processing in the step S211 corresponds to that in the step S125 in FIG. 5. Specifically, in a case of executing step S205, the transmission and reception management section 21 transmits to a device previously specified by the user, text data of "The charging rate is xx % at hh:mm:ss", "The temperature inside the vehicle is yy degrees at hh:mm:ss", or the like. The vehicle information management section 22 creates the text data based on the data acquired in step S205.

In a case of executing the step S209, the transmission and reception management section 21 first transmits the data acquired in the step S209 as text data to a device previously specified by the user. The transmission and reception management section 21 then transmits the data acquired in the step S210 as text data to the device previously specified by the user. The user receives through a mobile terminal carried by the user his/herself, first a latest value of the vehicle information stored in the vehicle information server 1 as text data and then a current value of the vehicle information acquired by the TCU 8 from the sensor 7 as text data.

The second overall processing procedure is then terminated. The processing in the step S211 may be designed to be executed only when requested by the user.

EFFECTS OF PRESENT EMBODIMENTS (1) The vehicle management system instantly responds to a question from a user. Since the response includes time information in addition to vehicle information, the user knows when the responded vehicle information was acquired and has a sense of relief.
(2) The vehicle management system transmits a message that it will take some time before providing a current value of vehicle information. The user thereby waits for a response in knowledge.
(3) The vehicle management system provides the message described in (2) above only in a case that a predetermined period of time has elapsed since the previous question. A user therefore does not need to respond to the message in a case that the predetermined period of time has not elapsed.
(4) The vehicle management system does not transmit as a response a time concerning vehicle information that has little changed. A user is therefore able to avoid being repeatedly informed of a value not changing over time, such as a fuel level during parking with a time. In addition, the user easily listens to the response.
(5) The vehicle management system particularly transmits an amount of charge (a charging rate) with a time as a response. This improves convenience for the user who is away from a vehicle during charging thereof.
(6) The vehicle management system provides a response in a text form, such as an e-mail. Even if having missed a voice response, therefore, a user is able to know a requested vehicle information by checking a mobile terminal device. The user can also confirms requested latest information.
(7) In a case where a user is concerned about vehicle information and is supposed to ask again, the vehicle management system communicates with the telematics communication unit and acquires a latest information, after receiving a first question. When the user asks again, the vehicle management system is thereby able to transmit the updated information to the user, thus improving convenience for the user.

EXPLANATION OF REFERENCES

1 Vehicle information server
2 Network
3 Speech processing system
4 Voice terminal device
8 Telematics communication unit (TCU)
11 Central control unit
12 Input device
13 Output device
14 Main storage
15 Auxiliary storage
16 Communication device
21 Transmission and reception management section
22 Vehicle information management section
31 Vehicle information
51 Communication device
52 Vehicle information acquisition section
53 Operation controller

The invention claimed is:
1. A vehicle management system comprising:
a telematics communication unit which is mounted on a vehicle and acquires vehicle information; and,
a vehicle information server which receives from the telematics communication unit the vehicle information and a time at which the vehicle information is acquired, stores the received vehicle information and time, and transmits the stored vehicle information and time to a speech processing system as a response to a question for the vehicle information when receiving the question about the vehicle information from the speech processing system,
wherein the vehicle information server transmits to the speech processing system a message that it takes some time before responding to a question for current vehicle information when receiving from the speech processing system the question about the current vehicle information.
2. The vehicle management system according to claim 1:
wherein, when receiving from the speech processing system a second question for current vehicle information, the vehicle information server transmits to the speech processing system a message that it takes some time before responding to the second question only in a case that a predetermined time has elapsed since a first question for the vehicle information was received.
3. A vehicle management system comprising:
a telematics communication unit which is mounted on a vehicle and acquires vehicle information; and,
a vehicle information server which receives from the telematics communication unit the vehicle information and a time at which the vehicle information is acquired, stores the received vehicle information and time, and transmits the stored vehicle information and time to a speech processing system as a response to a question for the vehicle information when receiving the question about the vehicle information from the speech processing system,
wherein the vehicle information server transmits to the speech processing system the vehicle information and the time as the response in a case that an amount of change over time in a piece of the vehicle information concerning the question is equal to or more than a predetermined amount; and,
wherein the vehicle information server only transmits to the speech processing system the vehicle information as the response in a case that an amount of change over time in a piece of the vehicle information concerning the question is less than the predetermined amount.
4. The vehicle management system according to claim 3:
wherein a piece of information having the amount of change over time equal to or more than the predetermined amount includes an amount of charge of the vehicle and a temperature inside the vehicle.
5. The vehicle management system according to claim 1:
wherein the vehicle information server transmits to an arbitrary device vehicle information, in the form of texts as the response, acquired at the time when the question for the vehicle information is received from the speech processing system.

6. The vehicle management system according to claim 1:
wherein the vehicle information server acquires vehicle information concerning the question from the telematics communication unit when receiving the question for the vehicle information from the speech processing system.

7. A vehicle management method applied by a vehicle management system comprising:
- a step in which a telematics communication unit, of the vehicle management system, mounted on a vehicle acquires vehicle information;
- a step in which a vehicle information server of the vehicle management system receives from the telematics communication unit the vehicle information and a time at which the vehicle information is acquired, and stores the received vehicle information and time;
- a step in which the vehicle information server transmits to a speech processing system the stored vehicle information and time as a response to a question for the vehicle information when receiving from the speech processing system the question for the vehicle information;
- a step in which the vehicle information server transmits to the speech processing system the vehicle information and the time as the response in a case that an amount of change over time in a piece of the vehicle information concerning the question is equal to or more than a predetermined amount; and,
- a step in which the vehicle information server only transmits to the speech processing system the vehicle information as the response in a case that an amount of change over time in a piece of the vehicle information concerning the question is less than the predetermined amount.

8. The vehicle management system according to claim 3:
wherein the vehicle information server transmits to an arbitrary device vehicle information, in the form of texts as the response, acquired at the time when the question for the vehicle information is received from the speech processing system.

9. The vehicle management system according to claim 3:
wherein the vehicle information server acquires vehicle information concerning the question from the telematics communication unit when receiving the question for the vehicle information from the speech processing system.

* * * * *